No. 692,832. Patented Feb. 11, 1902.
S. E. CREASEY.
AQUARIUM JARDINIÈRE.
(Application filed May 13, 1901.)
(No Model.) 2 Sheets—Sheet 2.
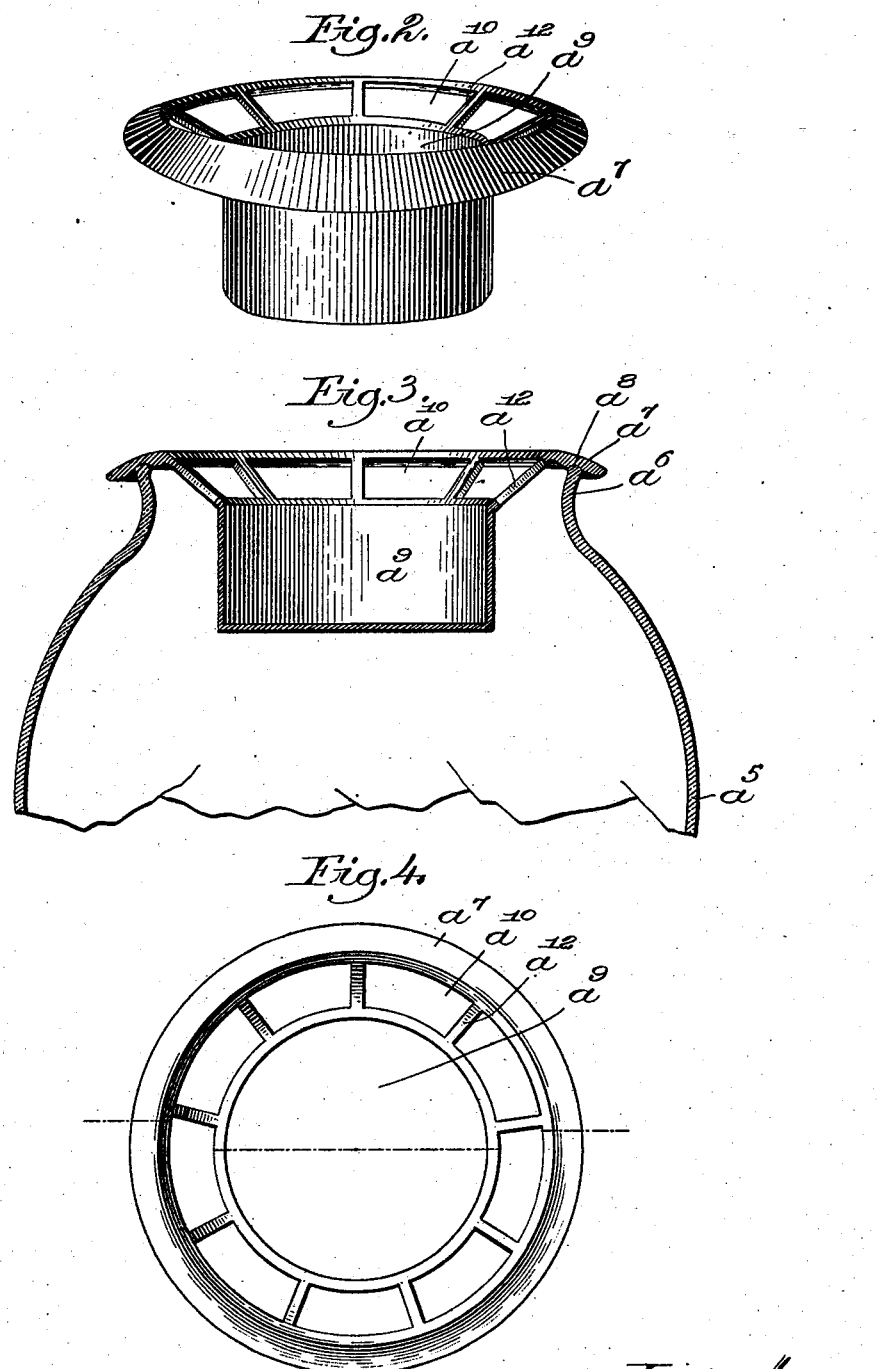

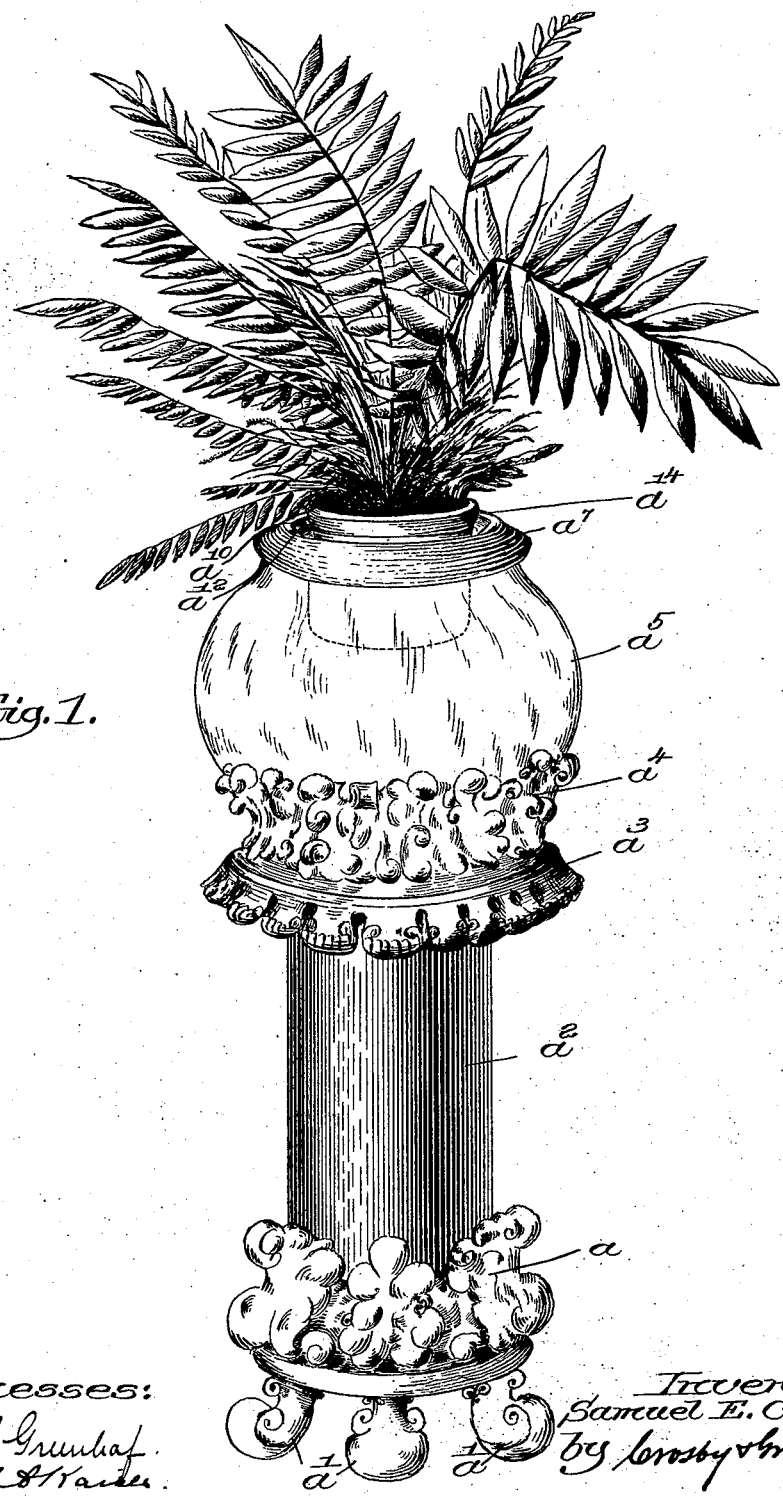

UNITED STATES PATENT OFFICE.

SAMUEL E. CREASEY, OF SANFORD, MAINE.

AQUARIUM-JARDINIÈRE.

SPECIFICATION forming part of Letters Patent No. 692,832, dated February 11, 1902.

Application filed May 13, 1901. Serial No. 59,907. (No model.)

*To all whom it may concern:*

Be it known that I, SAMUEL E. CREASEY, a citizen of the United States, residing at Sanford, county of York, Maine, have invented an Improvement in Aquarium-Jardinières, of which the following description, in connection with the accompanying drawings, is a specification, like letters on the drawings representing like parts.

My invention is an apparatus intended, primarily, for purposes of decoration or securing ornamental effects—as, for instance, in theaters, hotels, public buildings in general, &c.—although not being limited in these respects, but being of general utility wherever it is desired to have an extremely attractive and novel article of this nature.

In carrying out my invention I combine in such a manner as to attract the attention and arouse the curiosity and interest of the observer a provision for moving objects, such as fishes and other inhabitants of water, together with plants or other vegetable growth apparently springing therefrom, the aquarium portion of the apparatus being preferably made of glass or other suitable material for exhibiting the fishes, &c., and having at some point above the water-level suitable means for admitting air thereto and, if desired, for admitting a change of water and having also a receptacle for holding and partially or entirely concealing a flower-pot or other holder of growing shrubs or ornamental plants.

The constructional details of my invention will be pointed out more fully in the following description, reference being had to the accompanying drawings, in which I have illustrated one preferred embodiment of my invention, and the latter will be more particularly set forth in the appended claims.

In the drawings, Figure 1 is a perspective view of one embodiment of my invention. Fig. 2 is a perspective view of the holder. Fig. 3 is an enlarged vertical cross-sectional view, partly broken away, showing the general construction and arrangement of parts. Fig. 4 is a top plan view of Fig. 2.

As herein shown, my ornamental furniture or piece of apparatus comprises a base $a$, suitably mounted on legs $a'$, supporting a pedestal, shown as consisting of a column $a^2$, having an ornamental cap-piece $a^3$ and receiving portion $a^4$, in which is mounted a glass globe $a^5$, although it will be understood that the constructional details and ornamental effects thereof may be widely varied from the particular arrangement and designs herein illustrated.

The form of aquarium $a^5$ herein shown for purposes of illustration has a slightly-flaring mouth $a^6$ at its top portion. Resting on the edge of this mouth is a laterally-extending flange $a^7$, having a groove or seat $a^8$ in its under side, in which the edge of the aquarium is seated. The flange $a^7$ carries centrally thereof a cup-like receptacle $a^9$, arranged to hang down within the aquarium to a limited extent, and between the part $a^9$ and the flange $a^7$ are openings $a^{10}$ for the entrance of air and to give access to the interior of the aquarium without removing the cup-like receptacle or holder $a^9$. The form of the holder is such that the openings $a^{10}$ are concealed from view when the apparatus is complete, as shown in Fig. 1, the partitions or intermediate portions $a^{12}$, which suspend the cup, being for this purpose arranged, preferably, obliquely, thereby preventing their accidental closing by any object which is carried in the cup and also insuring that they are inconspicuous. A flower-pot $a^{14}$ is shown as contained in the cup $a^9$, (see Fig. 1,) said flower-pot containing earth in which may be planted any ornamental plant, as illustrated.

It will be understood that a suitable faucet or outlet for the aquarium will ordinarily be provided in the bottom thereof and, if desired, also an inlet for the water, so that when required a proper circulation may be kept up.

I do not lay claim to any special aquarium as such nor to the juxtaposition of an aquarium and flowers or vegetable growths, but rather to the special arrangement whereby a jardinière is provided, which, however, instead of having a porcelain body $a^5$ painted or otherwise decorated has its ornamentation consisting of the effects produced by living moving fish or other creatures, or, in other words, the body of the jardinière consists of an aquarium, and yet the entire article has the general effect and appearance of a regular jardinière. Besides this feature I intend to cover by my claims the special construction in which I have embodied my invention.

Having described my invention, what I claim as new, and desire to secure by Letters Patent, is—

1. A jardinière having a body portion adapted to hold water and contain living objects, a receptacle for containing growing objects, said receptacle depending within said body portion in concealed position and being impervious to the entrance of water from said body portion, and permitting the display of plants and the like without contamination thereby of the body of water.

2. A jardinière, consisting of an aquarium continuously open freely to the air at its top for supporting the life of living objects contained in the water therein and visible through the walls thereof, and provided with means extending within said aquarium adapted to hold growing objects out of contact with the water and permit them to extend out from the aquarium for purposes of display and ornamentation.

3. A jardinière, consisting of an aquarium through whose walls the living objects contained in the water may be seen, said aquarium being continuously open freely to the air at its top for supporting the life of said living objects, combined with a removable cup-like receptacle contained within the aquarium for supporting plants and permitting them to stand out from the aquarium in display position.

4. A jardinière having its body portion composed of an aquarium adapted to hold water and contain living objects, and having at its mouth a flanged holder, the flange being seated on the mouth of the aquarium part, said holder having a portion thereof extending downwardly within the aquarium for receiving and concealing a flower-pot or other article from which ornamental growths extend above the aquarium, said holder having air-openings between the depending portions and the top edge of the aquarium for the admission of air to the latter.

5. The combination with an aquarium having an open mouth, of a holder having a laterally-extending flange resting on said mouth and a cup suspended within the aquarium, the supports between said cup and flange extending obliquely and having openings therein through which air is admitted to the interior of the aquarium.

In testimony whereof I have signed my name to this specification in the presence of two subscribing witnesses.

SAMUEL E. CREASEY.

Witnesses:
WALTER K. EMERY,
ALBERT A. LITTLEFIELD.